US010353344B2

(12) United States Patent
Zschau

(10) Patent No.: US 10,353,344 B2
(45) Date of Patent: Jul. 16, 2019

(54) DEVICE AND METHOD FOR CALCULATING HOLOGRAPHIC DATA

(71) Applicant: SEEREAL TECHNOLOGIES S.A., Munsbach (LU)

(72) Inventor: Enrico Zschau, Dresden (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 0 days.

(21) Appl. No.: 14/896,085

(22) PCT Filed: Jun. 4, 2014

(86) PCT No.: PCT/EP2014/001503
§ 371 (c)(1),
(2) Date: Dec. 4, 2015

(87) PCT Pub. No.: WO2014/195013
PCT Pub. Date: Dec. 11, 2014

(65) Prior Publication Data
US 2016/0132021 A1   May 12, 2016

(30) Foreign Application Priority Data

Jun. 6, 2013   (DE) .................. 10 2013 105 876
Sep. 27, 2013  (DE) .................. 10 2013 110 711
Sep. 27, 2013  (DE) .................. 10 2013 110 712

(51) Int. Cl.
*G03H 1/08* (2006.01)
*G03H 1/22* (2006.01)
*G03H 1/26* (2006.01)

(52) U.S. Cl.
CPC ......... *G03H 1/0841* (2013.01); *G03H 1/0808* (2013.01); *G03H 1/2294* (2013.01);
(Continued)

(58) Field of Classification Search
CPC .............. G03H 1/0841; G03H 1/2294; G03H 2001/0858; G03H 2001/2605;
(Continued)

(56) References Cited

U.S. PATENT DOCUMENTS 7,839,548 B2   11/2010  Schwerdtner
8,325,401 B2   12/2012  Schwerdtner et al.
(Continued)

FOREIGN PATENT DOCUMENTS

EP   2587320 A1    5/2013
WO   2004044659 A2 5/2004
(Continued)

OTHER PUBLICATIONS

Ito, et al., "Special-purposed computer HORN-5 for real-time electroholography", Optics Express, vol. 13, No. 6 XP055139056, Jan. 1, 2005, p. 1923.
(Continued)

Primary Examiner — Jade R Chwasz
(74) Attorney, Agent, or Firm — Saul Ewing Arnstein & Lehr LLP

(57) ABSTRACT

An apparatus and a method for optimized calculation of 2D sub-holograms for object points of a three-dimensional scene and a pipeline for real-time calculation of holograms are provided. The invention shortens the calculation time of a hologram for representing a three-dimensional scene and/or to reduce the calculation complexity of such a hologram. This is achieved by a 2D sub-hologram of an object point, which has image elements of the spatial light modulator, comprises a half 1D sub-hologram, where the radius of each image element is determined and each image element of the 2D sub-hologram is fixedly assigned to at least one image element of the half 1D sub-hologram with identical or similar radius by way of an electronic circuit, by a method
(Continued)

for encoding a hologram, and by a pipeline on the basis of FPGA and/or ASIC.

6 Claims, 11 Drawing Sheets

(52) U.S. Cl.
CPC ............ *G03H 2001/0858* (2013.01); *G03H 2001/2605* (2013.01); *G03H 2210/30* (2013.01); *G03H 2210/452* (2013.01); *G03H 2226/02* (2013.01)

(58) Field of Classification Search
CPC ........... G03H 2210/452; G03H 1/0005; G03H 1/0808; G03H 2210/30; G03H 2001/0224; G03H 2001/2242; G03H 2226/02; G03H 2001/0825; G03H 1/26; G03H 2210/20
USPC .......................................................... 359/9
See application file for complete search history.

(56) References Cited

U.S. PATENT DOCUMENTS

| 8,395,616 | B2 | 3/2013 | Schwerdtner et al. |
| 9,081,363 | B2* | 7/2015 | Nam .................... G03H 1/0808 |
| 2009/0083355 | A1 | 3/2009 | Takemori et al. |
| 2010/0073744 | A1 | 3/2010 | Zschau et al. |
| 2011/0096145 | A1 | 4/2011 | Schwerdtner et al. |

FOREIGN PATENT DOCUMENTS

| WO | 2006/066919 A1 | 6/2006 |
| WO | 2007118842 A1 | 10/2007 |
| WO | 2007135165 A1 | 11/2007 |
| WO | 2008025839 A1 | 3/2008 |
| WO | 2008138979 A1 | 11/2008 |
| WO | 2011121130 A2 | 10/2011 |

OTHER PUBLICATIONS

Kim, et al., "Effective memory reduction of the novel look-up table with one-dimensional sub-principle fringe pattersn in computer-generated holograms", Optics Express, vol. 20, No. 11 XP055102161, May 21, 2012, p. 12021.

Kwon, et al., "Hardware implementation of N-LUT method using field programmable gate array technology", Practical Holography XXV: Materials and Applications, SPIE. 1000 20th St. Bellingham, WA 98225-6705 USA, vol. 7957, No. 1 XP060005336, Feb. 10, 2011, pp. 1-8.

Takashi, et al., "Fast calculation of ocmputer-generated hologream using the circular symmetry of zone plates", Optics Express, vol. 20, No. 25, XP055138878, Dec. 3, 2012, pp. 27496-27502.

International Search Report, dated Sep. 29, 2014, issued in priority international Application No. PCT/EP2014/001503.

* cited by examiner

DEVICE AND METHOD FOR CALCULATING HOLOGRAPHIC DATA

CROSS REFERENCE TO RELATED APPLICATIONS

This application claims the priority of PCT/EP2014/001503, filed on Jun. 4, 2014, which claims priority to German Application No. DE 10 2013 105 876.0, filed on Jun. 6, 2013, German Application No. DE 10 2013 110 711.7, filed on Sep. 27, 2013, and German Application No. DE 10 2013 110 712.5, filed on Sep. 27, 2013, the entire contents of each of which are incorporated fully herein by reference.

BACKGROUND OF THE INVENTION

The present invention relates to an apparatus having a hardware architecture and to a method for calculating and encoding hologram data, as can be used for example for representing three-dimensional scenes (3D scenes) and objects using a holographic display.

The invention in particular also relates to an apparatus for optimized calculation of 2D sub-holograms for object points of a three-dimensional scene for a holographic display, and to a method for calculating a 2D sub-hologram for object points of a three-dimensional scene for a spatial light modulator (SLM), to an apparatus and to a method for encoding a hologram of a three-dimensional scene in a spatial light modulator, and to a pipeline for real-time calculation of holograms.

A holographic display of this type and a calculation method for calculating holographic data is described for example in the following publications: WO 2004/044659 A2, WO 2006/066919 A1, WO 2007/118842 A1, WO 2007/135165 A1, WO 2008/025839 A1, WO 2008/138979 A1 and WO 2011/121130 A9. The content of these publications is hereby incorporated in its entirety. These publications describe in particular the term sub-hologram and its meaning in detail, to which reference will be made in the following text. Said publications also describe what is meant by 1D and 2D encoding, that is to say one-dimensional or two-dimensional encoding of a (sub-)hologram.

Previous approaches have been based for example on utilization of the symmetry, in particular mirror symmetry, in the sub-hologram calculation, that is to say that only hologram values for one quadrant (i.e. in one quarter) of a 2D sub-hologram need to be calculated. The values of the remaining three quadrants are not explicitly calculated, but the calculated values of the first quadrant of the 2D sub-hologram are used to determine the values of the three remaining quadrants, specifically by obtaining or copying the values of the calculation result of the first quadrant of the 2D sub-hologram by way of a corresponding mirroring of the values of the first quadrant along the main axes of the 2D sub-hologram. What is meant by mirror symmetry is at least one axis symmetry and/or a point symmetry, where the point symmetry can relate in particular to the centerpoint of a sub-hologram SH.

Even with this, the complexity is still incredibly high; in the case of such 2D encoding, the complexity is higher, for example, compared to the 1D encoding by a factor of 100 and more, specifically in particular dependent on the pitch of the image elements (pixel pitch, center-to-center spacing of two image elements) of the spatial light modulator used for hologram representation—which spatial light modulator is also referred to as SLM—and the scene depth to be represented. What is meant by the pitch is in particular a size which is composed of the size of an image element (pixel size) and the respective spacing between two neighboring image elements (pixel spacing) of the spatial light modulator.

Such a method for calculating a 2D sub-hologram according to the prior art will now be described:

For each image element of the first quadrant of a 2D sub-hologram, the phase and the amplitude are calculated with which the light that is used to represent a three-dimensional scene is to be modulated or influenced by the spatial light modulator. The phase is here the result in particular of parameters such as the distance or the spacing between an object point to be represented and the spatial light modulator, and the pitch of the image elements (pixel pitch) ($p_x$, $p_y$), wherein $p_x$ designates the pitch of the image elements in the x-direction and $p_y$ designates the pitch of the image elements in the y-direction. The distance of an object point to be represented from the spatial light modulator will be designated in the following as focus (F). After the calculation of the polar coordinates, amplitude and phase, a very calculation-intensive step is subsequently carried out, the transformation of the phase and the amplitude in the Cartesian space with real and imaginary values. This is what permits the accumulation, that is to say the superposition, of the calculated 2D sub-hologram with other 2D sub-holograms in the sum hologram.

FIG. 1 gives a brief overview of the calculation of a 2D sub-hologram according to the prior art and of the calculation process for establishing the entire hologram of the three-dimensional scene to be represented, wherein, in addition to the above-mentioned parameters, $\varphi$ is furthermore the phase value, A is the amplitude value of the respective image element, $\lambda$ is the wavelength of the utilized light, $SH_w$ is the sub-hologram width and $SH_h$ is the sub-hologram height and b is the brightness of the object point.

The symmetry is utilized since the position of the image element (x, y) is incorporated as a square in the phase calculation. FIG. 2 clarifies this again.

Further principles for calculating holograms with 2D sub-holograms are known, for example, from the publications mentioned in the introductory part, and are therefore not explained further at this point.

The present invention is based on the object of specifying and developing an apparatus and a method of the type mentioned in the introductory part, with which the previously mentioned problems are overcome. In particular, the objective is to shorten the calculation time of a hologram for representing a three-dimensional scene and/or to reduce the calculation complexity of such a hologram as compared to the methods known from the prior art. Representing a three-dimensional scene in this case is to be read in the sense of reconstructing a three-dimensional scene.

SUMMARY OF THE INVENTION

The object is achieved according to the invention by way of the teaching of the claims and by way of their advantageous configurations and developments in accordance with other claims which are dependent on said claims.

The object is achieved by way of an apparatus for calculating a 2D sub-hologram. A 2D sub-hologram of this type is used to represent an object point of a three-dimensional scene using holographic display. 2D sub-holograms of all object points of the three-dimensional scene to be represented are required in order to generate, by way of the superposition thereof, a complete hologram of the three-dimensional scene to be represented, simply referred to as hologram below.

The holographic display for representing an object point of a three-dimensional scene comprises a spatial light modulator with a matrix of image elements. Said image elements are also referred to as pixels, cells and also as pixel cells. An image element can also comprise a plurality of sub-image elements. In this case, the image element corresponds to a macrocell. The 2D sub-hologram to be calculated contains complex values which can be associated with image elements of the spatial light modulator (SLM), and has a rotational symmetry since it images only one object point of the three-dimensional scene. A complex value in this context is understood to mean in particular a complex number in the mathematical sense. According to the invention, the apparatus for calculating a 2D sub-hologram for representing an object point of a three-dimensional scene is characterized in that the 2D sub-hologram contains a half 1D sub-hologram along a section through the 2D sub-hologram from the origin of the 2D sub-hologram up to a maximum radius of the 2D sub-hologram, wherein the radius of each image element is determined and each image element of the 2D sub-hologram is fixedly assigned to at least one image element of the half 1D sub-hologram with identical or similar radius by way of an electronic circuit. The maximum radius here is the radius of the circle enclosing the 2D sub-hologram.

This is possible since, as described above, a 2D sub-hologram of an individual object point has rotational symmetry. However, the amplitudes and phase values of image elements of the 2D sub-hologram that have the same distance from the origin of said 2D sub-hologram are therefore identical, i.e. are identical for all image elements of the same radius. The calculation of one such image element thus suffices to be able to use said values likewise for other image elements of the same radius.

In order to effectively reduce the calculation time and the calculation complexity for the calculation of a hologram which is to be generated from the superposition of such 2D sub-holograms, it is advantageous to assign, by way of an electronic circuit, image elements of the same or at least similar radius to an image element of a half 1D sub-hologram, which, with the above-described location from the origin of the 2D sub-hologram up to a maximum radius, is part of the 2D sub-hologram, with the same radius and to then carry out the calculation only for this one image element.

Owing to the fixed assignment by way of an electronic circuit, no additional step of ascertaining radii of other image elements, the additional addressing thereof or using look-up tables is thus necessary for this step. Such an electronic circuit can be realized as a digital circuit. However, analog circuits can also be used.

In one embodiment of the apparatus according to the invention, each image element of the 2D sub-hologram can be fixedly assigned to at least one image element of the half 1D sub-hologram by way of an electronic circuit in a manner such that the radius of the image element of the 2D sub-hologram corresponds to the radius of an image element of the half 1D sub-hologram that is multiplied by a direction-dependent elongation factor.

Such an electronic circuit is advantageously realized in the form of a hard-wired matrix.

In one advantageous embodiment, the electronic circuit is implemented on field programmable gate arrays (FPGAs), that is to say a programmable circuit, and/or application-specific integrated circuits (ASICs).

As described above, it is now known that, in the case of a rotational symmetry of the 2D sub-hologram, the amplitudes and phase values of image elements of the 2D sub-hologram that have the same distance from the origin of said 2D sub-hologram are identical, i.e. are identical for all image elements of the same radius. However, arranging the image elements in the spatial light modulator (SLM) in matrix form, wherein the image elements have a defined size and a defined pitch, has the result that although amplitude and phase values are calculated for concrete radius values of the image elements of the half 1D sub-hologram, a series of image elements are contained in the 2D sub-hologram of the object point, the radius values of which deviate from those of the half 1D sub-hologram. For small deviations, the corresponding values calculated for the half 1D sub-hologram are still used therefor.

For greater deviations of radii of image elements of the 2D sub-hologram from the radii of the concrete image elements of the half 1D sub-hologram, however, it is advantageous to determine the necessary amplitude and phase values by utilizing the values of two or more image elements of the half 1D sub-hologram with similar radii to that of the relevant 2D sub-hologram image element. In principle, this can take place in linear form or also in non-linear, quadratic or generally in exponential form. The latter is sensible since the quantization error increases toward the edge of a 2D sub-hologram, that is to say toward greater radii.

In a preferred embodiment, the apparatus according to the invention therefore comprises in its electronic circuit means for generating intermediate values by linking two or more image elements of the half 1D sub-hologram and for assigning the corresponding image elements of the 2D sub-hologram to said intermediate values.

In order to generate, according to the above-mentioned object, a hologram of the entire three-dimensional scene to be represented, an apparatus according to the invention for calculating such a hologram as claimed in claim 6 comprises at least one above-described apparatus according to the invention for calculating a 2D sub-hologram of an object point of said three-dimensional scene. In addition, an apparatus according to the invention for calculating such a hologram comprises:

means for transforming the 2D sub-hologram generated with the apparatus according to the invention for calculating a 2D sub-hologram from polar to Cartesian coordinates, and also from Cartesian to polar coordinates. These, too, can be realized in a hard wiring.

means for positioning the 2D sub-hologram on the spatial light modulator (SLM) as a function of the location of the object point of the three-dimensional scene and the position of an observer of said scene, and means for superposing the respective 2D sub-holograms of different object points of the three-dimensional scene to be represented by addition of the respective real and imaginary parts of the same image elements.

The above-described object is furthermore achieved by a corresponding method for calculating a 2D sub-hologram for representing an object point of a three-dimensional scene using a holographic display, wherein the holographic display comprises a spatial light modulator with a matrix of image elements.

A 2D sub-hologram to be calculated contains in this case complex values which can be assigned to image elements of the spatial light modulator (SLM). The method according to the invention additionally uses a rotational symmetry of the 2D sub-hologram to encode the 2D sub-hologram into the spatial light modulator (SLM).

Here, each image element of the 2D sub-hologram is assigned to at least one image element of a half 1D sub-hologram having an identical or similar radius value, wherein the half 1D sub-hologram extends along a section through the 2D sub-hologram from the origin of the 2D sub-hologram up to a maximum radius of the 2D sub-hologram, and values for phase and amplitude for each image element of a half 1D sub-hologram are calculated and transferred to all respectively assigned image elements of the 2D sub-hologram.

The method according to the invention is characterized here in that the assignment of the image elements of the 2D sub-hologram to the image elements of the half 1D sub-hologram is realized in a fixedly encoded manner by way of an electronic circuit. This is clarified in FIG. 5, which will be described in detail further below.

In one embodiment of the method according to the invention, each image element of the 2D sub-hologram can be fixedly assigned to at least one image element of the half 1D sub-hologram by way of an electronic circuit such that the radius of the image element of the 2D sub-hologram corresponds to the radius of an image element of the half 1D sub-hologram that is multiplied by a direction-dependent elongation factor.

In order to ensure simple further processing of the 2D sub-hologram for representing an object point of a three-dimensional scene on the way to representing the entire scene, in one advantageous embodiment of the method according to the invention, a complex-valued 1D sub-hologram with the polar coordinates amplitude and phase is transformed, after its calculation, into a Cartesian coordinate system. This is sensible since such a transformation before the superposition of individual 2D sub-holograms for generating a hologram of the entire three-dimensional scene simplifies the superposition operation. To this end, only the respective real parts of the same image elements of 2D sub-holograms to be superposed and the respective imaginary parts need to be added up.

In order to counter the problem of inequality of the radii of 2D sub-hologram image elements with respect to those of the half 1D sub-hologram, and thus the necessity of countering deviations of amplitude and phase values of the relevant image elements from those of the image elements of the half 1D sub-hologram with nearest radii, in one advantageous embodiment of the method according to the invention, intermediate values are generated by linking at least two image elements of the half 1D sub-hologram and the corresponding image elements of the 2D sub-hologram are assigned to said intermediate values.

In one particular embodiment of the method according to the invention, the intermediate values are generated by virtual multiplication of the number of image elements of the half 1D sub-hologram or by interpolation of the values of at least two image elements of the half sub-hologram.

In order to further simplify the calculation of the 2D sub-holograms, it is here particularly advantageous if the half 1D sub-hologram extends along the x-axis of the 2D sub-hologram or along the y-axis of the 2D sub-hologram.

It is also possible in a particular embodiment of the method according to the invention for calculating a 2D sub-hologram for an object point of a three-dimensional scene to combine the rotational symmetry of the 2D sub-hologram with a mirror symmetry to achieve the above-mentioned object. It is thus possible to calculate either only one quadrant or possibly only one half of a quadrant of the 2D sub-hologram using the hitherto described method for calculating a 2D sub-hologram and, after one quadrant has been calculated, to then either calculate the remaining three quadrants, or, after only one half of a quadrant has been calculated, to calculate the remaining half of the quadrant and the remaining three quadrants using mirroring.

A method according to the invention for calculating a hologram for representing the entire three-dimensional scene initially produces 2D sub-holograms for all the object points to be represented of this scene by way of the described method for calculating a 2D sub-hologram. Subsequently, each of the image elements of each 2D sub-hologram undergoes, according to the location of the object point to be represented with the 2D sub-hologram and to the position of an observer of said scene, an offset in the x-direction and in the y-direction. The 2D sub-holograms which are positioned thusly relative to one another are finally added up, that is to say superposed.

In concrete terms this means the displacement of the phase and amplitude values of a 2D sub-hologram, preferably after their transformation into Cartesian coordinates with real and imaginary part, by a number of n elements in the x-direction and m elements in the y-direction, wherein n and m are obtained from the location of the object point to be represented and the position of the observer. Subsequently, these real and imaginary parts of the corresponding image elements of all 2D sub-holograms are added up.

Furthermore, a method for encoding a hologram of a three-dimensional scene in a spatial light modulator of a holographic display by way of superposition, i.e. overlapping, of sub-holograms of individual object points of a three-dimensional scene, also referred to as scene points, as claimed in claim 15 contributes to achieving the above-mentioned object.

According to such a method according to the invention for encoding a hologram of a three-dimensional scene in a spatial light modulator in one dimension (1D encoding), a sub-hologram segment of a first half of a sub-hologram having a defined segment width, that is to say a segment with a defined number of memory elements, is calculated for a hologram row. Here, the memory elements can be assigned in each case to image elements. Offset positions are determined for this sub-hologram segment of the first half and for a sub-hologram segment of a second half of the sub-hologram, wherein the offset positions define the respective position within a hologram row at which the sub-hologram segments are added up, wherein the addition is preferably carried out in a complex-valued manner.

The sub-hologram segment of the second half of the sub-hologram is generated by duplication and mirroring of the sub-hologram segment of the first half.

Subsequently, the sub-hologram segment of the first half and its offset position are included in a computation path for the first half and the sub-hologram segment of the second half and its offset position are included in a computation path for the second half of the sub-hologram, in which in each case the addition of the sub-hologram segments takes place in hologram row memories which are independent from one another.

The independent hologram row memories of the first and the second sub-hologram halves are finally recombined.

However, according to the invention, the sub-hologram segments are aligned according to the ascertained offset positions at the hologram row memory before the addition. This simplifies the subsequent addition method, since controlling the hologram row memory becomes easier, and enables a more effective utilization of the hologram row memory.

It is advantageous here for the method according to the invention if the sub-hologram segment is transformed from the polar coordinate system into a Cartesian coordinate system after the calculation. Owing to the utilisation of symmetry properties, the complexity for this transformation is reduced to approximately half.

According to an advantageous variant of the method according to the invention, the alignment of the sub-hologram segments is achieved by way of mapping a non-aligned sub-hologram segment onto two neighboring segments which are aligned at the hologram row memory by way of displacement by the difference value of an integer multiple of the number of elements of a segment and the offset position, determined for this sub-hologram segment, within a segment, and zero-padding the still remaining elements of the two neighboring segments. The two neighboring aligned segments are added up in two independent hologram row memories, wherein this is generally done in parallel.

Advantageously, the displacement of the sub-hologram segment is effected by way of a pipeline having a number of stages, corresponding to the number of elements of a sub-hologram segment, wherein in each stage the elements are displaced by one element until the ascertained difference value is reached, and are passed on along the remaining stages without displacement. A further advantageous variant of the displacement of the sub-hologram segment is effected by way of a fixed logic, in which the displacement is selected according to the difference value by a multiplexer.

In one particular embodiment variant of the method according to the invention for encoding a hologram of a three-dimensional scene in a spatial light modulator of a holographic display, the respective method steps, which were described for a 1D encoding, are repeated according to the number of hologram rows used so as to realize a 2D encoding. The respective method steps do not here have to be repeated sequentially but can rather be effected in parallel, i.e. a parallel encoding of the different hologram rows is possible.

In one preferred solution of the method according to the invention for encoding a hologram, the sub-hologram segment of the first half is generated in aligned fashion and is added up in an independent hologram row memory. This solution is used especially for the 1D encoding, that is to say in the generation of a half-parallax hologram, but can also be applied to 2D encoding, that is to say the generation of a full-parallax hologram.

What is of particular advantage here is if, in the method according to the invention for encoding a hologram, the sub-hologram segment of the second half of the sub-hologram is generated by duplication and mirroring of the sub-hologram segment of the first half and linked to the sub-hologram segment stored in the previous cycle, the elements of the current sub-hologram segment are displaced by the difference value of an integer multiple of the number of elements of a segment and the offset position determined for said sub-hologram segment, and the sub-hologram segment that is aligned at the memory is separated off and added up in a hologram row memory.

Finally, the object of the present invention is achieved by way of a method for encoding a hologram using sub-holograms, in which 2D sub-holograms are generated using the apparatus according to the invention for calculating 2D sub-holograms and/or by way of the method according to the invention for calculating 2D sub-holograms.

The calculation and outputting of holograms for representation on a holographic display, in particular on the basis of the proposed apparatuses and methods, using hard-wired circuits, will be described below in the form of a pipeline for hardware-based real-time calculation of holograms with the aid of sub-holograms and direct controlling of a holographic display which is hardware-based. Such a pipeline also contributes to achieving the stated object.

Such a pipeline is wherein parts of the pipeline or the entire pipeline are carried out in the form of a programmable circuit so as to subsequently alter functional units or add new ones.

A pipeline according to the invention for real-time calculation of holograms comprises means for calculating sub-holograms and for directly controlling a holographic display. It is characterized in that the pipeline is realized on the basis of one or more application field programmable logic gate arrays (FPGA) and/or one or more application-specific integrated circuits (ASIC), and the application field programmable logic gate arrays (FPGA) and/or application-specific integrated circuits (ASIC) used here are subsequently configurable, i.e. configurable even during the runtime.

In particular, such a pipeline can comprise an apparatus according to the invention for calculating a 2D sub-hologram for representing an object point of a three-dimensional scene.

In one preferred embodiment the pipeline comprises functional units which are electronically interconnected, wherein the following fundamental functions are realized:
  receiving object points for describing a scene to be reconstructed via an interface,
  calculating the corresponding hologram(s), and
  outputting the hologram(s) via an interface for representing on a spatial light modulator (SLM).

The functional units are fixedly integrated in the circuit, but are configurable during the runtime, that is to say not assigned to a specific SLM or holographic display.

As already described, the pipeline is realized on the basis of FPGA and/or ASIC, with the FPGA or ASIC used being configurable during the runtime. This means that the ASICs or FPGAs do not need to be designed for a specific type of holographic display, but can be matched to their environment (type of display etc.) by corresponding configuration during start-up. If appropriate, they can be reconfigured subsequently. This enables the design of such a pipeline such that both 1D and 2D holograms can be calculated and output in real time, and different encoding types and output modes can be supported.

In one preferred embodiment of the pipeline, the resolutions for hologram and content are independent of the hardware used, i.e. the resolutions are thus independent of the FPGA or ASIC used.

Furthermore, by way of a high degree of parallelism during processing, it is possible with such a pipeline to ensure high calculational power with low clock frequency. This is important in particular with respect to a minimum power consumption.

In one preferred embodiment of the pipeline according to the invention, the scalability of the apparatus for different display sizes and/or hologram resolutions and/or scene resolutions and/or display parameters is ensured by a variable activation of the computation paths. Such a pipeline thus comprises computation paths which can be deactivated but can also be reactivated. In one further embodiment of the pipeline according to the invention, the workload of the circuit can be maximized and the required resources (chip area/energy) can be minimized by realizing dynamic sub-hologram sizes.

Furthermore, by limiting the buffering to a few hologram rows, the local memory capacity in the FPGA and/or in the ASIC can be minimized. This is a crucial advantage since memories increase the energy consumption and the space requirement (chip area).

In one advantageous embodiment, the pipeline is organized such that hologram calculation and hologram output behave asynchronously with respect to one another and take place with a different frame rate. As a result, in the case of short-term bottlenecks in the calculation, a continuous output of the holograms can still take place. A similar behavior is implemented between the input (content) and the calculation.

Output and calculation can deliberately take place with different frame rates, wherein the calculation frame rate typically relates to the content frame rate.

As already described, parts of the pipeline or the entire pipeline can be carried out in the form of a programmable circuit in order to subsequently alter functional units or add new ones (for example by FPGA or mixed form FPGA with fixed functional units). This is preferably carried out in the area interfaces and encoding so as to be able to subsequently carry out adjustments with respect to transfer formats and the hologram encoding.

The functions or functional units of the pipeline for hardware-based real-time calculation of holograms with the aid of sub-holograms and direct controlling of a holographic display can be summarized as follows:

- accepting object points of a scene to be reconstructed, an object point contains color and position information. Here, preferably a video image-based transmission via a digital electronic interface is carried out. Other methods are also conceivable.
- (optional) intermediate storage of object points in a memory.
- (optional) reading object points from the intermediate memory.
- calculating sub-holograms from object points.
- accumulation of sub-holograms into a sum hologram.
- encoding the hologram according to the method of operation of the SLM.
- (optional) intermediate storage of holograms (encoded or not encoded) in a memory.
- (optional) reading holograms (encoded or not encoded) from the intermediate memory.
- controlling the hologram output according to the method of operation of the SLM.
- generating the image output format required for the method of operation of the SLM.
- outputting the fully calculated hologram in the image output format required for the SLM.

Preferably, a video image-based transmission is carried out via a digital electronic interface. Other methods are also conceivable.

- controlling further apparatuses required for the holographic representation such as lasers or apparatuses for light deflection.
- configuring the functional units at the start of the pipeline. Here, parameters and/or programs are transmitted via an interface that initialize or configure the pipeline or its functional units at the start.

There are different possibilities for advantageously configuring and developing the teaching of the present invention and/or for combining the above-described embodiments, where possible. To this end, reference will be made to the patent claims which are dependent on patent claim 1, and also to the following explanation of the preferred exemplary embodiments of the invention with the aid of the drawings. Preferred embodiments and developments of the teaching will also generally be explained in connection with the description of the preferred exemplary embodiments of the invention with reference to the figures.

DETAILED DESCRIPTION OF THE INVENTION

In the present invention, a rotational symmetry is advantageously used for the apparatus and the method for calculating 2D sub-holograms 2D-SH and as such for the calculation of holograms, as described above. Use of the mirror symmetry can be dispensed with. Since the phase calculation described in the prior art in principle tends to mean a calculation of phase values that describes or approximates the imaging function of a lens with a focus F, the function parameters x and y are used to describe a radius R, wherein the phase, i.e. the complex value, is identical for all x and y that generate the identical radius R. R is obtained from x and y with the rule: $R^2=x^2+(S*y)^2$, where $S=p_y/p_x$. The scalation with the parameter S serves for correctly taking into account the vertical pitch of the image elements BE in the radius calculation for rectangular image elements BE, for which $p_x \mathrel{!}= p_y$. The new rule for calculating the phase is $\varphi=(\pi*R^2*p_x^2)/(\lambda*F)+\varphi 0$. The complex value is obtained from the phase $\varphi$ and amplitude A.

A complex value in this context is understood to mean in particular a complex number in the mathematical sense. Mirror symmetry can be understood to mean at least one axis symmetry and/or a point symmetry, wherein the point symmetry can relate in particular to the centerpoint of a sub-hologram SH.

It is then possible for the associated radius to be determined for each image element BE in the first quadrant or also for all other quadrants. By calculating a phase profile or a section—for example along the x-axis or along a diagonal—a function profile is obtained which can be regarded as a type of look-up table and/or be used as a look-up table. It is then possible to determine the complex value for each image element by way of the fact that the radius serves as an argument for the look-up table.

The utilization of such a method, however, is highly memory-intensive, since it is possible to operate in parallel here only to a limited extent. Accesses to a look-up table generally take place sequentially since memory modules, owing to the principle design, provide data only sequentially. That is to say, such an implementation using access to a look-up table on a computer system or on an FPGA (field programmable gate array) or an ASIC (application-specific integrated circuit) is limited in particular owing to the memory bandwidth of the data access. Even the use of multiples of the number of memory modules for processing a plurality of accesses in parallel is sensible only to a limited extent, since this is accompanied with enormous use of resources.

This aspect is addressed according to the invention by way of a special electronic, preferably digital, circuit, which is particularly applicable to FPGAs and ASICs. In very general terms, however, it is possible to use any suitable computer hardware for this.

Figure 3:
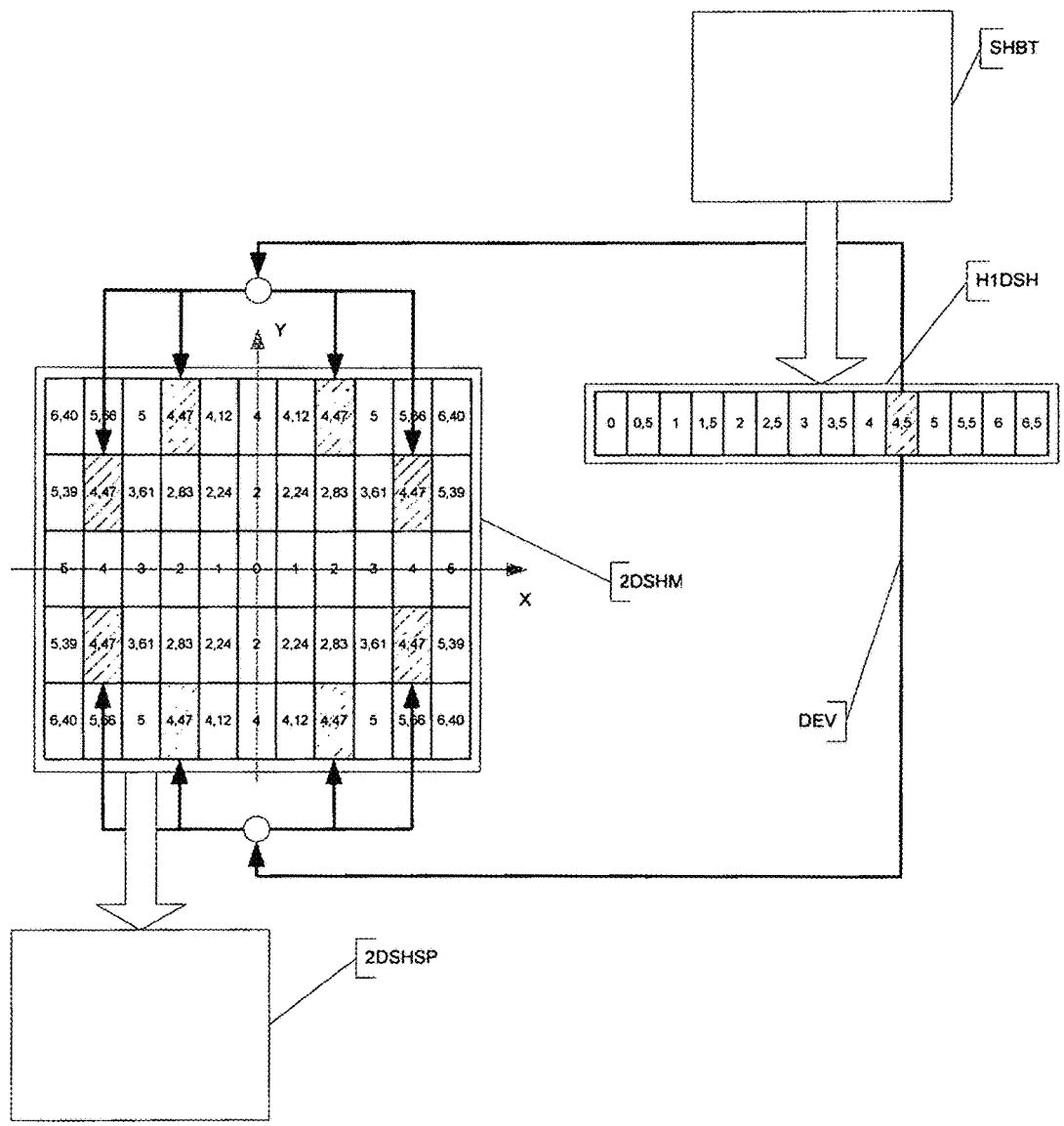
FIG. 3: shows an example for assigning the image elements of the 2D sub-hologram matrix to a 1D sub-hologram

Instead of calculating or applying the rotational symmetry sequentially consistently live by a look-up table, a hardwired matrix is created as a special digital circuit, which matrix electrically connects each image element BE of a 2D sub-hologram 2D-SH with at least one specific image element BE in a half 1D sub-hologram 1D-SH. This is illustrated in FIG. 3, which shows an example of the assignment of the image elements of the 2D sub-hologram matrix 2DSHM to a 1D sub-hologram 1D-SH in the physical sense and also in the sense according to the method. Here, the following method steps are illustrated:
the 1D sub-hologram calculation and transformation into the Cartesian space, SHBT,
the 2D sub-hologram superposition, 2DSHSP.

In addition, the following apparatus features are illustrated:
a 1D sub-hologram half consisting of a plurality of image elements for different radii, wherein each image element stores a complex value, H1DSH.
a 2D sub-hologram matrix, the image elements of which are directly connected to the corresponding image elements of the half 1D sub-hologram 1D-SH. 2DSHM,
the direct electronic wiring of the register of an image element in the half 1D sub-hologram with all relevant image elements in the 2D sub-hologram, DEV. This takes place analogously for all other cells.

In the first step, a 1D sub-hologram 1D-SH of half size is calculated. The result is a greater number of complex values k consisting of in each case imaginary value (or imaginary part) and real value (also referred to as real part). Each complex value is now buffered in two registers, one for real value, one for imaginary value. A register is a digital-electronic circuit for storing number values in digital circuits. There are thus k*2 registers in a 1D sub-hologram 1D-SH with a number of n image elements BE. Furthermore, a matrix of A'*B' image elements BE exists, in each case consisting of two registers—this represents a 2D sub-hologram 2D-SH. A specific number of these image elements BE in the 2D sub-hologram 2D-SH was assigned the most suitable image element BE in the 1D sub-hologram 1D-SH. The assignment took place off-line. Said image elements BE are now connected by way of the fact that an electrical, fixedly installed, parallel, continuous and in particular complete data transfer from the two registers in the 1D sub-hologram 1D-SH to the registers in the 2D sub-hologram 2D-SH that are determined according to the assignment takes place. This means that every time a value in a register in the 1D sub-hologram 1D-SH changes, the corresponding registers in the 2D sub-hologram 2D-SH likewise automatically change. This transfer usually takes place with edge triggering. However, other transfer methods are also conceivable. Just as conceivable is the use of electric analog storage and transfer instead of digital transfer.

The choice as to which image elements BE of the 2D sub-hologram 2D-SH are connected to which image elements BE of the half 1D sub-hologram 1D-SH takes place via the radius. Always that image element BE of the 1D sub-hologram 1D-SH the radius R of which corresponds most closely to the radius R' of the image element BE of the 2D sub-hologram 2D-SH is selected, and the complex value thereof is then used for the image element BE of the 2D sub-hologram 2D-SH, see in this respect FIG. 3. Here, for the image element BE of a 2D sub-hologram 2D-SH with the radius R'=4.47, the image element BE of the half 1D sub-hologram 1D-SH with the closest value of the radius R=4.5 is chosen. Assignment for all other cells takes place analogously. However, instead of selecting the closest radius R, any other rules are also conceivable.

It can thus be necessary to tolerate a certain quantization error, since the image elements BE are calculated only for a limited number of radii R.

A great power gain lies in the fact that only a fraction of a 2D sub-hologram 2D-SH to be calculated needs to be calculated in the form of the half 1D sub-hologram 1D-SH. In a preferred variant of the apparatus according to the invention and of the method according to the invention, the very calculation-intensive transformation into the Cartesian space takes place.

Another objective is to find a way to reduce the complexity involved in the hologram calculation with 2D sub-holograms 2D-SH. One way in this direction is the realization of an apparatus with a hardware architecture for calculating hologram data. This should be effected preferably in real time, in particular for terminals on the basis of FPGA and/or ASIC, which are characterized primarily by appropriate or low energy consumption. These would permit, for example, use in the mobile field and could be manufactured with realistic expenditure and manageable costs.

The number of the transistors used for the electric circuit of the apparatus influences the costs of the manufacture but also the energy consumption thereof. That is to say, the larger the electrical circuit, the more transistors need to be provided and the more complicated and costly are the manufacture and development thereof. This is essential especially for mobile terminals with a limited energy reserve and limited heat dissipation.

The advantages of 2D encoding, i.e. encoding with 2D sub-holograms 2D-SH, over 1D encoding, that is to say encoding with 1D sub-holograms 1D-SH, are known and were described in the publications mentioned in the introductory part. The important features to be mentioned in particular are:
- the elimination of the astigmatism in the holographic representation or reconstruction of individual object points with a great scene depth (wherein an object to be represented can be decomposed into individual object points) and
- a full holographic parallax (2D) in the holographic visualization.

In order to reduce a quantization error, it is possible for the number k of the image elements BE in the half 1D sub-hologram 1D-SH to be increased, i.e. to reduce the step width to the increment of the radius R, see in this respect FIG. 3, with a doubling of the number k of image elements BE (that is to say a half radius step width). A finer assignment of image elements of the 2D sub-hologram 2D-SH to image elements of the half 1D sub-hologram 1D-SH is thus possible. For this purpose, a linear increase or any desired other increase function can be used. Since the quantization error increases toward the edge of the 2D sub-hologram 2D-SH, a non-linear (for example quadratic) increase of the radius R along the half 1D sub-hologram 1D-SH is sensible, i.e. in the edge region the resolution is significantly higher than in the region of the first image element with the radius 0. In contrast, a linear increase is less effective in causing increased accuracy in the edge region, but this has the advantage that the calculation of the 1D sub-hologram 1D-SH can be significantly simplified, and therefore also be implemented more effectively.

In the hologram reconstruction, this leads, with linear increase, to the accuracy of the reconstruction being very good in the center of the viewing window, i.e. the "window" in which the reconstruction of the three-dimensional scene is visible to the observer, see in this respect for example WO 2006/066919 A1, but decreases depending on the selected resolution toward the edge, since here the quantization errors increase and become particularly noticeable at the edge of the viewing window. In contrast, a consistent quality can be achieved for a non-linear curve, i.e. a constant error can be achieved—substantially in the entire region of the viewing window.

Figure 4:
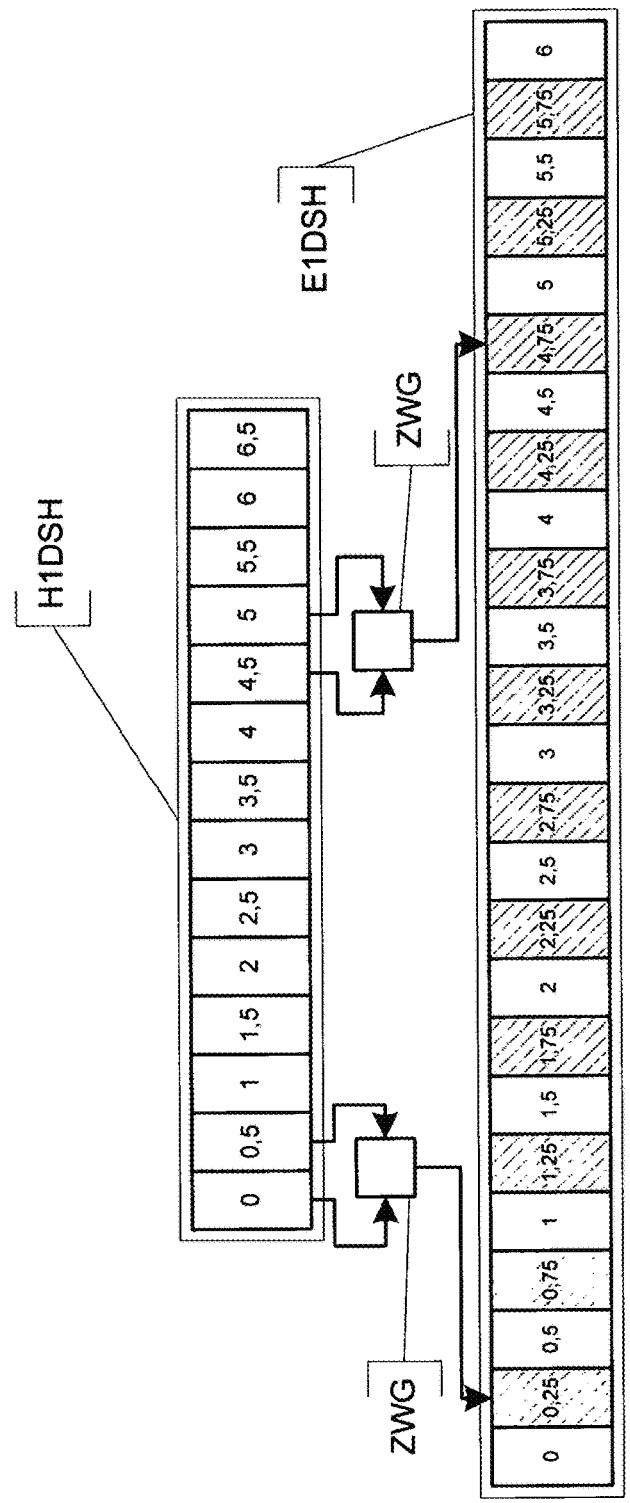
FIG. 4: shows the generation of intermediate values by way of interpolation

A further possibility for reducing the quantization errors is to carry out interpolations between neighboring image elements BE in the half 1D sub-hologram 1D-SH in order to generate further intermediate values in additional registers with low additional complexity. This is illustrated in FIG. 4. What is shown in particular here is
- how, from a 1D sub-hologram half, consisting of a plurality of image elements for different radii, wherein each image element stores a complex value, H1DSH, intermediate values of two or more image elements are generated, ZWG,
- and thus an extended 1D sub-hologram with additionally generated intermediate values, E1DSH, is produced.

The simplest example is a linear interpolation of two neighboring image elements BE with the radii $R_1=4.5$ and $R_2=5$ to generate an intermediate value with $R_{12}=4.75$. The calculation rule would be $Re_{12}=(Re_1+Re_2)/2$ and $Im_{12}=(Im_1+Im_2)/2$. In a digital circuit, only a single addition is necessary for this, since the division by two can take place by cutting off the last bits without effort. In addition to linear interpolation, quadratic or logarithmic or exponential interpolation is also possible.

The decision as to which method is applied concretely, and the determination of the resolution on which the calculation and the "copying step" should be based, must be made depending on the specific case and error tolerance of the holographic system.

The 2D sub-hologram matrix and its fixed link with the half 1D sub-hologram register are determined, on the basis of the maximum occurring sub-hologram size, off-line or not in real time and subsequently synthesized in an electric digital circuit, which can be implemented in an FPGA/ASIC.

The novel method is then integrated into the procedure used thus far. The module, connected upstream, for calculating a half 1D sub-hologram 1D-SH generates the data, in particular the complex values in the Cartesian space, which are transferred into the above-mentioned 1D sub-hologram register. Immediately or, depending on the implementation, a few clock cycles later, the complete 2D sub-hologram 2D-SH is then available. The known accumulation—that is to say adding up of the calculated or determined 2D sub-holograms—into the sum hologram takes place in one or more processing steps.

Despite the fixedly implemented matrix, the method makes possible the use of dynamic sub-hologram sizes, i.e. the sub-hologram size varies depending on the distance of the associated object point from the hologram plane or is dependent on the position of the object point to be represented, the current position of the viewing window which is positioned in the immediate vicinity of an observer's eyes, and the position of the spatial light modulator SLM, by way of the fact that only the relevant part of the half 1D sub-hologram 1D-SH is calculated and only the corresponding detail of the 2D sub-hologram 2D-SH is also further processed. This enables balancing of the calculational power for three-dimensional scenes with a very high and at the same time with low complexity, or it enables energy saving mechanisms to be used in less complex three-dimensional scenes.

The method can be used for spatial light modulators SLMs with square or with rectangular image element structures. The half 1D sub-hologram 1D-SH is here calculated along the direction of higher resolution, possibly with additional image elements, thus smaller radius increments. Thus sufficient intermediate values are available to determine the direction of lower resolution. In principle it is also conceivable to use other sub-hologram geometries, for example a line, circle or polygon shape.

The method can also be used to combine rotational symmetry and mirror symmetry. Here, for example only the first quadrant of the 2D sub-hologram 2D-SH or even only half of it is determined with the proposed method, wherein the halving of the first quadrant takes place along the diagonal. The remaining three quadrants can then be determined by mirror symmetry. This is sensible in particular if the accumulation of the 2D sub-hologram 2D-SH is to take place at another position within the calculation system and only a limited bandwidth for transmission is available.

The advantage of the method according to the invention and of the apparatus according to the invention is the clear simplification of the calculation of 2D sub-holograms 2D-SH in FPGAs or ASICs. The order of magnitude for reducing the required calculational power is approximately a factor of 100; this can be more or less, depending on the display or SLM type. The calculation complexity for a complete 2D hologram for representing the three-dimensional scene, that is to say what is known as a 2D sum hologram, thus decreases substantially to the level of a 1D hologram calculation, but with corresponding additional complexity in terms of the accumulation and the hologram storage, since significantly higher quantities of data must be processed. However, since the calculation units for these large data quantities are omitted, corresponding resources are saved: especially the step of transforming into the Cartesian space (with sin/cos) is completely omitted at this point.

A disadvantage could be that, owing to quantization effects, the accuracy is reduced. However, by correspondingly matching the sampling rate by way of increasing the number of image elements BE in the half 1D sub-hologram 1D-SH for the 1D sub-hologram 1D-SH to be calculated, this can be compensated for according to the requirements with acceptable additional effort.

Figure 1:
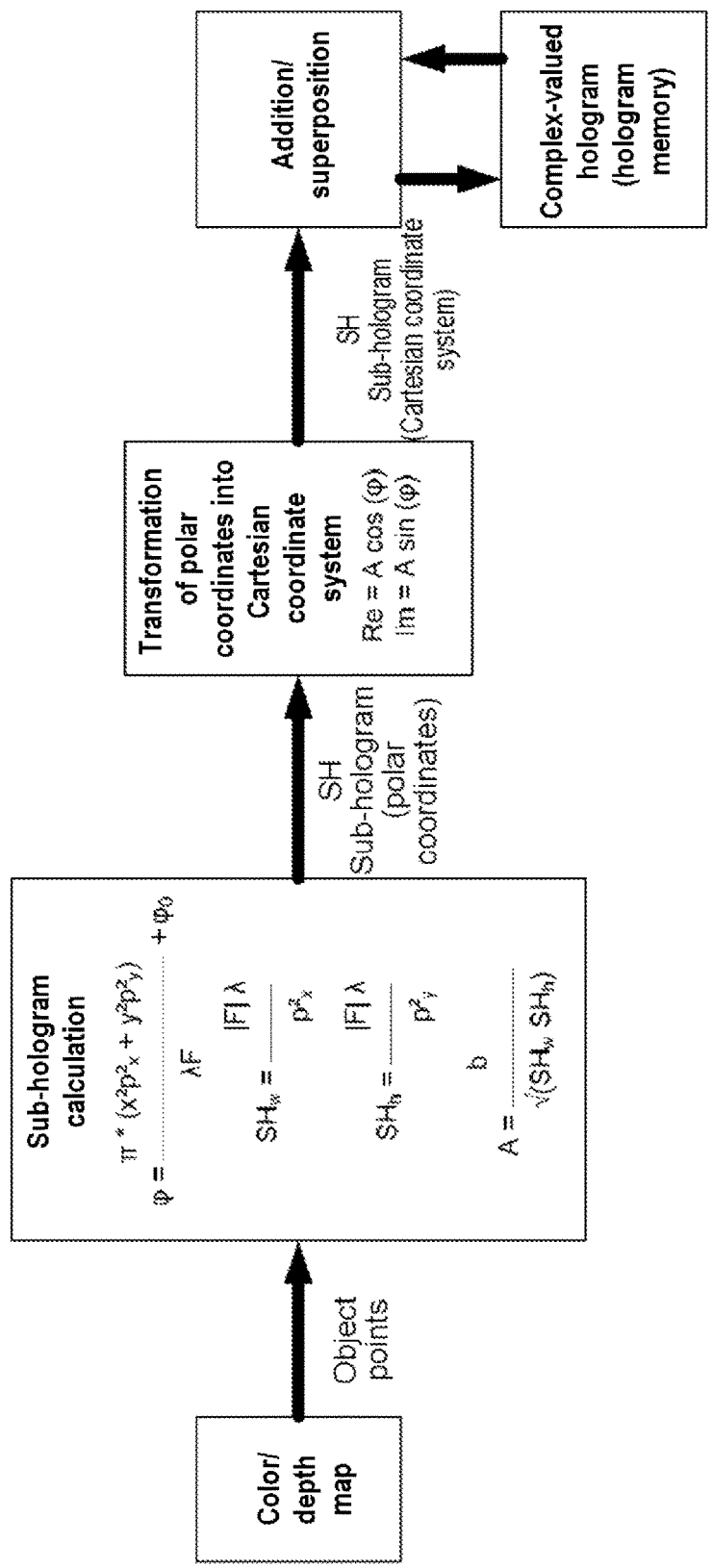
FIG. 1: shows the calculation procedure for a complex-valued hologram of a three-dimensional scene according to the prior art
Figure 2:
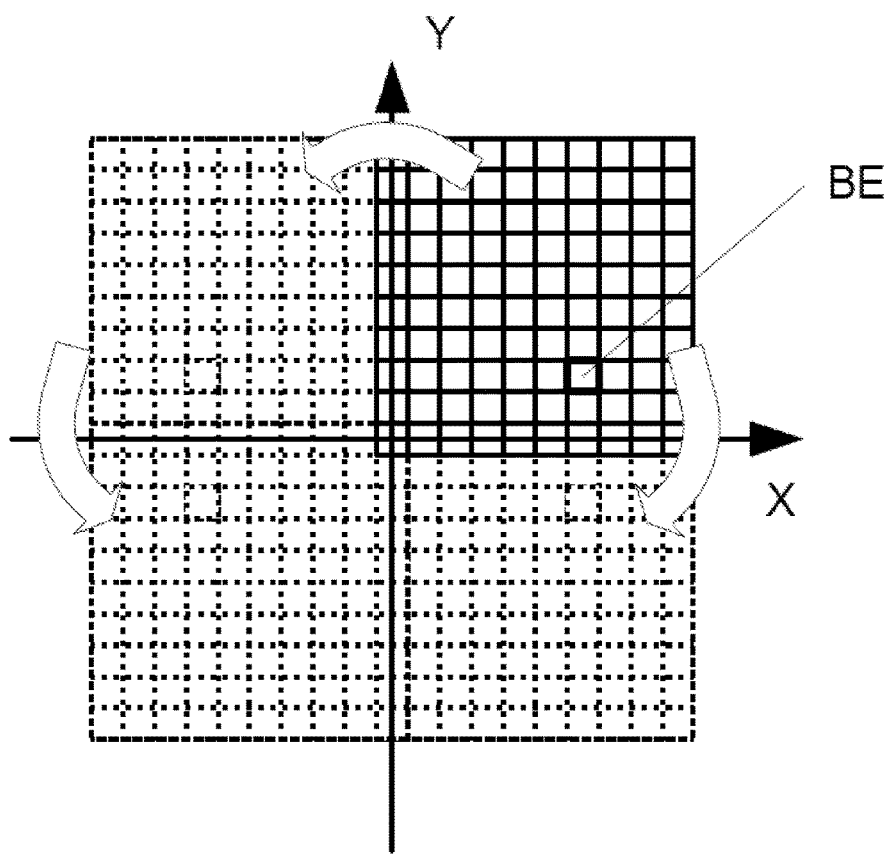
FIG. 2: shows the mirror symmetry in 2D sub-holograms according to the prior art
Figure 5:
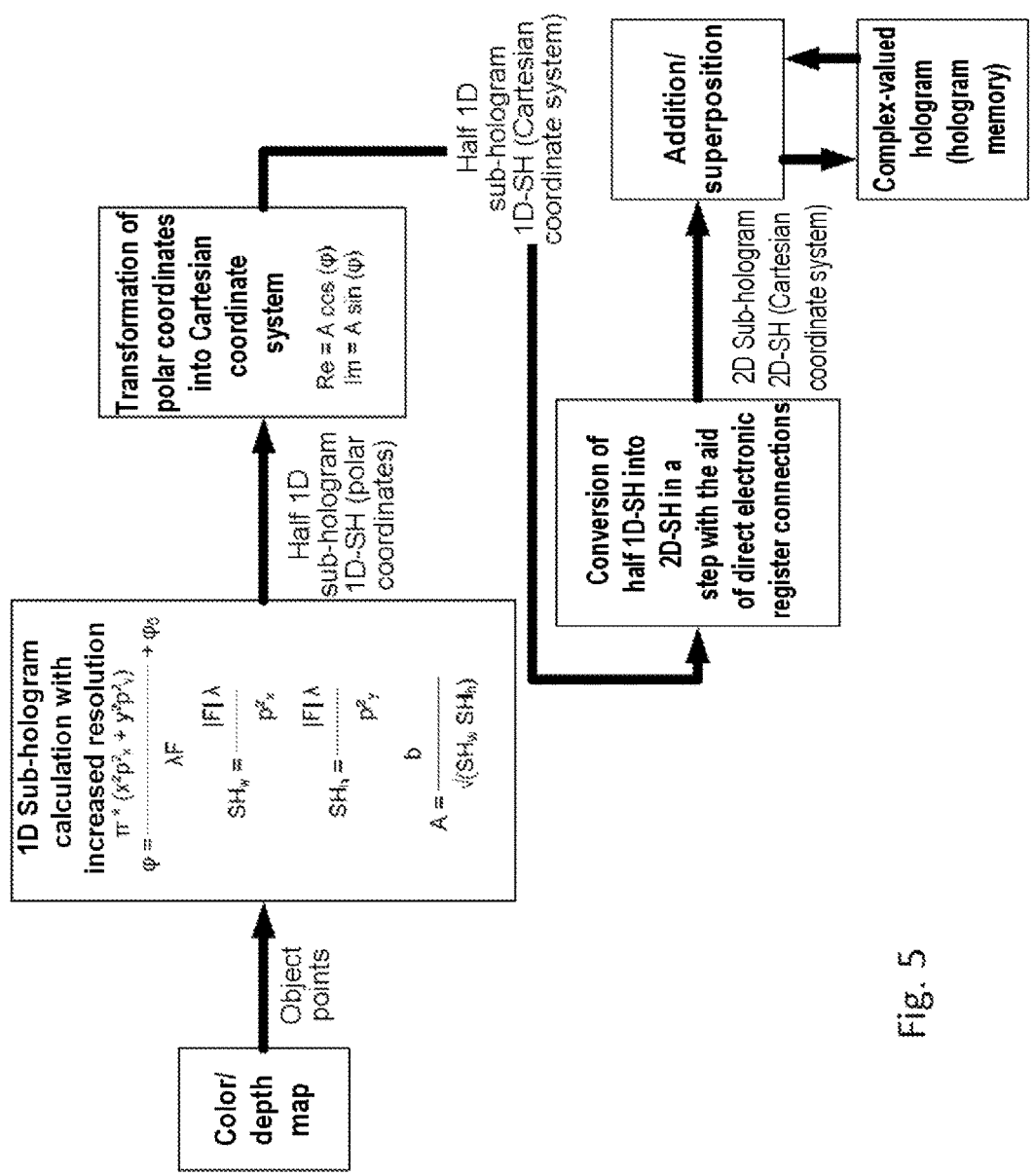
FIG. 5: shows the calculation procedure for a complex-valued hologram of a three-dimensional scene by utilizing the method according to the invention for generating 2D sub-holograms of object points of this scene with utilization of a 1D sub-hologram, which extends along the x-axis of the 2D sub-hologram.

FIG. 5 finally illustrates the calculation procedure for a complex-valued hologram for representing a three-dimensional scene with utilization of the method according to the invention for generating 2D sub-holograms of object points of said scene with utilization of a 1D sub-hologram that extends along the x-axis of the 2D sub-hologram. This procedure is a significant simplification of the method as compared to a calculation procedure according to the prior art, see FIG. 1, since the first complex steps are reduced to the half 1D sub-hologram, while they always take place for the entire 2D sub-hologram according to the prior art.

Figure 6:
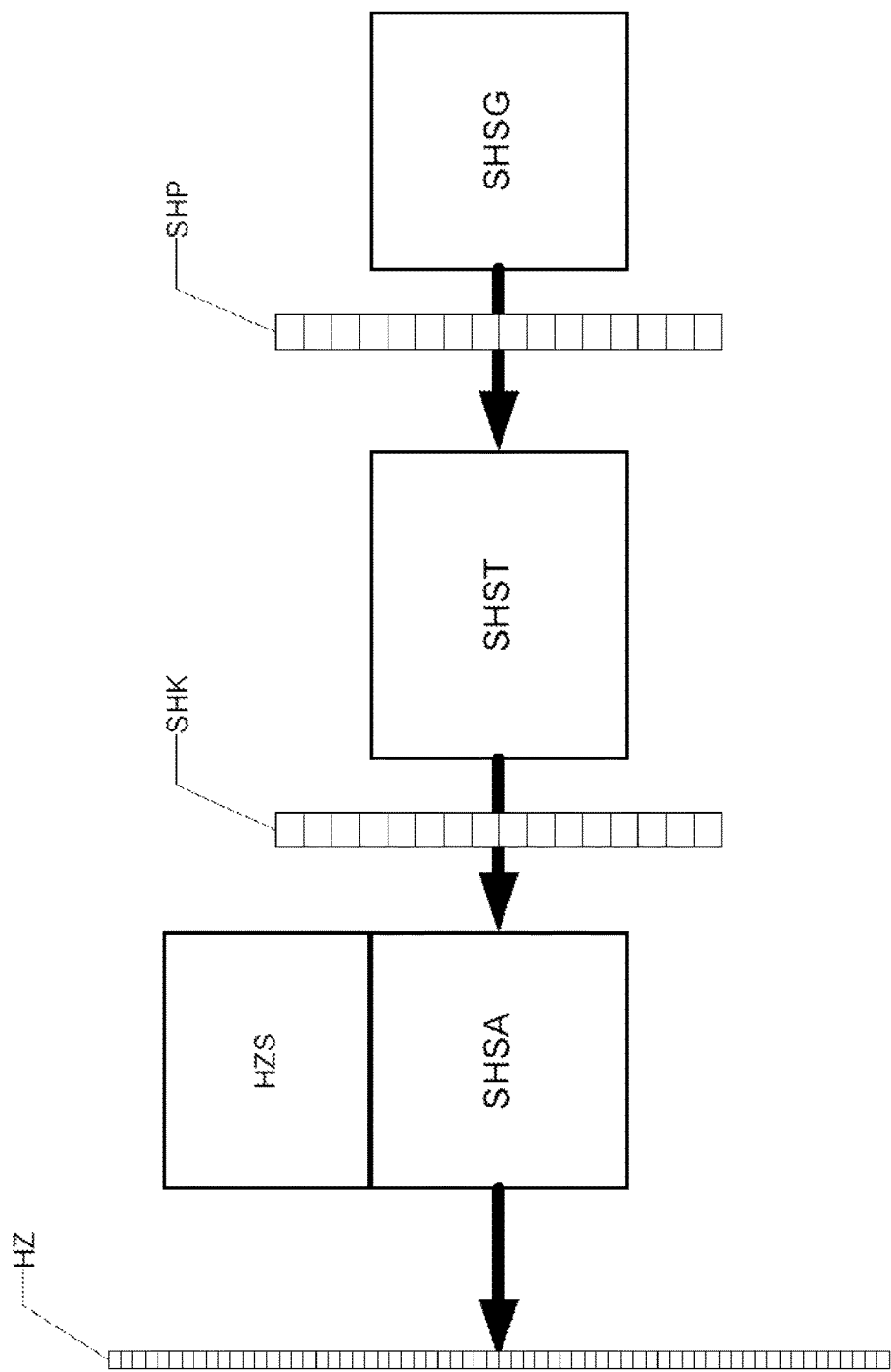
FIG. 6: shows a holographic computational pipeline without using symmetry according to the prior art

At this point, further hardware aspects should be described, which are useful for the achievement of the above-mentioned object of the invention:

The starting point is a holographic computational pipeline without utilization of a symmetry according to the prior art, as is shown in FIG. 6.

The sub-hologram segment generator SHSG generates here a sub-hologram segment with complex values for image elements in the polar coordinate system SHP. What follows is a sub-hologram segment transformation SHST, which results in a transformed sub-hologram segment with complex values for image elements in the Cartesian coordinate system SHK.

Subsequently, the sub-hologram segment addition SHSA takes place using the hologram row memory HZS. The resulting hologram row HZ consists of a plurality of added-up sub-holograms (superposition of sub-holograms).

Since no symmetries are used, the calculation and superposition for all image elements of the sub-hologram takes place, which leads to a high calculational complexity.

In the development of circuits for application-specific integrated circuits ASICs and application field programmable logic gate arrangements FPGAs, there are many challenges and guidelines for implementing calculation procedures efficiently and in a space-saving manner. Important objectives are a low space requirement, since the costs are lower the fewer transistors are included, and a relatively high frequency, because the higher the frequency, the fewer transistors are necessary, since each transistor can produce more work in less time—this depends on the field of use and the energy requirement: the higher the frequency, the higher the energy consumption.

In application-specific integrated circuits ASICs and application field programmable logic gate arrays FPGAs, in contrast to conventional computer systems, no linear program is executed, but produced is a fixed switching network to which data are supplied to the input and which outputs data again after a finite period of time. By logical operations within the fixed circuit, the data are processed, changed, linked and so on. Arithmetic operations (for example addition, subtraction, multiplication, comparisons) or memory cells or elements (registers, latches or addressable memory blocks) can be produced, for example.

Binary and logical links, i.e. links with and, or etc. can be carried out therewith. Access to memory blocks in the application field programmable logic gate arrays FPGAs must only take place with data which are aligned on the basis of the memory addresses—in contrast to computers, where the data is automatically aligned by the processor, which on the other hand is also associated with delays. Generally, processor-based computer architectures (with von-Neumann-principle) are very slow in comparison to application-specific integrated circuits ASICs and field programmable gate arrays FPGAs, since the processor-based computer architectures operate quasi sequentially.

An important feature of circuits is in particular the simplification of calculation procedures into as many simple and linear procedures as possible with as few data dependencies as possible, that is to say fixed paths for achieving high frequencies. Setting calculation procedures to run in parallel enables a high throughput overall. Ideal are especially image-based calculations, including holography, which process data in the sequence in which they arrive, since intermediate storage, in particular in the case of large data quantities, often represents an enormous bottleneck.

The use of the symmetry mentioned above in generating sub-holograms SH is relatively simple to formulate and implement in theory or on a computer system with sequential processing and any desired sequential memory access. However, implementing this in a fixed, linear and parallel operating system is complicated. This is explained for 1D sub-holograms below. Since the method can be applied in principle also to 2D sub-holograms by repeating the method steps according to the number of the used hologram rows, the following makes reference only to sub-holograms.

The motivation is to save the calculation of one of the two sub-hologram halves—so only one half of a sub-hologram SH would have to be calculated. This is noticeable especially in the transformation, i.e. the conversion, of the values of the memory elements that are assigned to the image elements of the sub-hologram SH from the polar representation into the Cartesian representation. For this circuit part, the space requirement is the greatest.

For the sub-hologram calculation for ASICs or FPGAs, several complex values of neighboring image elements of the sub-hologram are calculated in parallel—so-called sub-hologram segments, for example with a segment width SB=16. A sub-hologram segment thus contains in each case one complex value (phase or value, or real part or imaginary part) per memory element, assigned to the image elements of a sub-hologram SH.

The problem is now to duplicate the generated sub-hologram segments, to mirror them, and to align them with the segment width to which the memory width corresponds (in this case for example 16 memory elements) and to add them up in local hologram row memories. This should be effected in a manner which saves as much space as possible and/or uses as few resources as possible, so as to be significantly better than the normal execution without taking into account the symmetry. In the variant without symmetry, no additional alignment is necessary since the sub-hologram segments can already be correctly aligned in this case during generation.

The generated sub-hologram segment of the first half is calculated and subsequently transformed from polar coordinates into Cartesian coordinates. During the calculation, two offset positions are determined, one for the sub-hologram segment of one half, and one for the sub-hologram segment, which is to be mirrored later, of the other half. The offset positions determine the position or the memory address in the hologram row at which the segments are added up in a complex-valued manner, wherein the memory address, that is to say the memory element, can in turn be assigned to a concrete image element BE, although such an assignment does not take place in a fixed manner.

After the transformation, for example by a CORDIC algorithm, a sine-cosine algorithm in the FPGA, duplication of the sub-hologram segment into a second computation path takes place. In this step, the mirroring of the memory elements with respect to their arrangement inside the segment takes place simultaneously. That means that memory element 0 becomes (in the case of 16 memory elements) memory element 15, 1 becomes 14, 2 becomes 13 etc.

Figure 7:
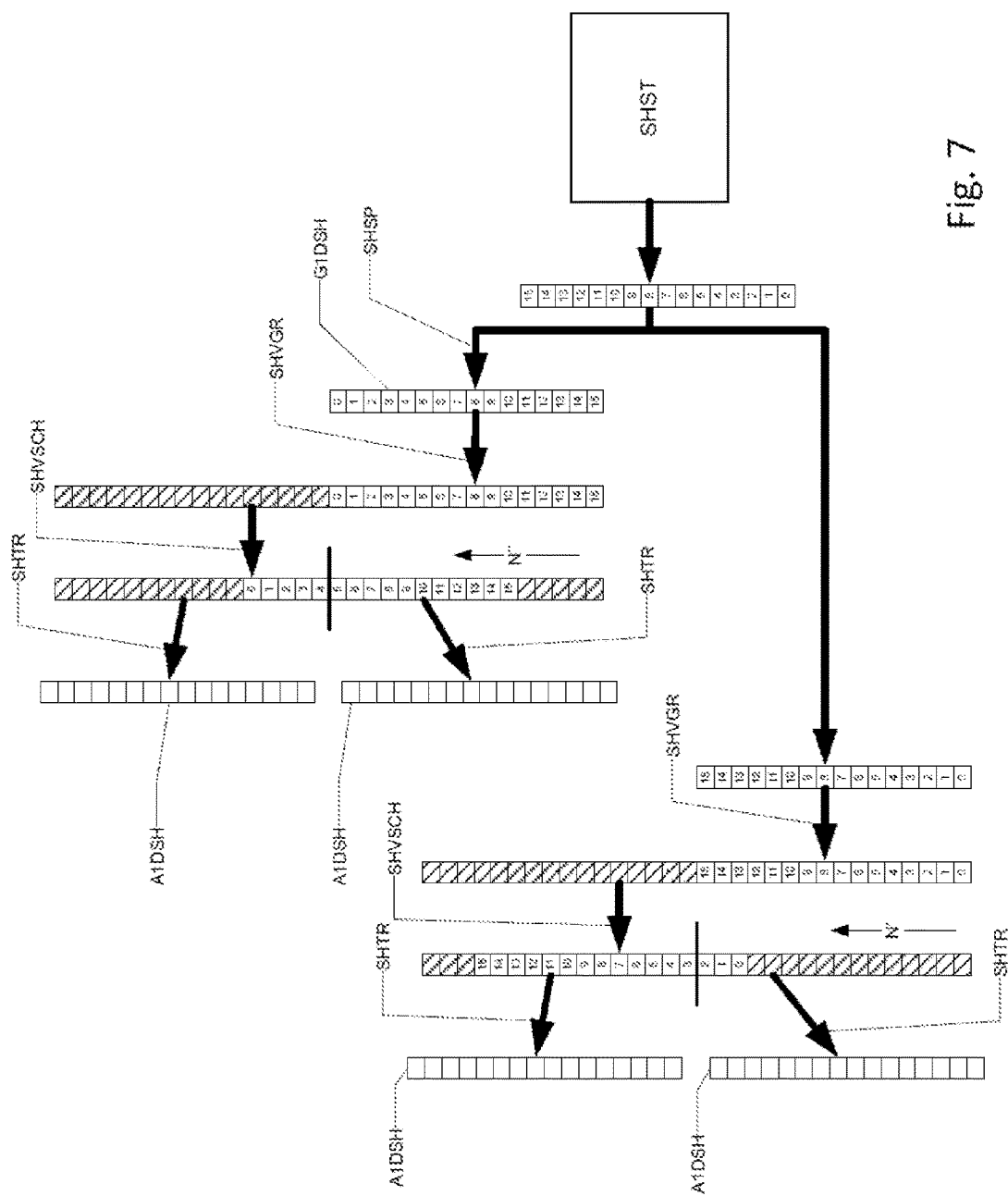
FIG. 7: shows a holographic computational pipeline for a method for encoding a hologram of a three-dimensional scene by using a symmetry by way of mirroring and alignment (first solution variant of a method for encoding a hologram of a three-dimensional scene)

This is illustrated in FIG. 7, which shows a first solution variant of a method for encoding a hologram of a three-dimensional scene, specifically a holographic computational pipeline for a method for encoding a hologram of a three-dimensional scene by utilizing a symmetry by way of mirroring and alignment.

The following steps are shown therein:
the sub-hologram segment transformation SHST,
the mirroring of the incoming sub-hologram segment SHSP, which leads to the mirrored sub-hologram segment G1DSH in a second computation path,
the enlargement of the sub-hologram segment to twice the width SHVGR in both computation paths, followed in each case by the
displacement of the sub-hologram segment by N' or N'' elements, either in stages, i.e. in N' or N'' steps, or immediately with the aid of a multiplexer SHVSCH,
separating the double-width sub-hologram segment into two segments aligned at the memory SHTR, and as a result
the sub-hologram segment A1DSH that is aligned at the memory.

In this first solution variant, both computation paths therefore now in each case include one sub-hologram segment, which must both be added up into the current hologram row. In order for this to happen, both segments must be aligned at the hologram row memory. To this end in each case an unaligned sub-hologram segment is mapped onto two neighboring aligned sub-hologram segments. This happens as follows: a sub-hologram segment is enlarged to twice the width (here an example from 16 to 32 elements with complex-valued content), wherein the upper 16 memory elements are zero-padded. The 16 memory elements are now displaced by N' or N'' memory elements within the doubled sub-hologram segment. N' or N'' is obtained from the offset position of the image element BE of the sub-hologram SH and the number of image elements or memory elements per sub-hologram segment. In the described example, the number N'=13 and N''=5. Subsequently, a separation occurs back into two sub-hologram segments, which are now both aligned, as is likewise illustrated in FIG. 7 for the first solution variant.

The displacement by N' or N'' memory elements can in turn be effected in two different ways. First, it is possible to implement a pipeline with a number of stages corresponding to the segment width, in the example described here this would be 16, which displaces in each stage the memory elements by one memory element of the hologram row memory, or passes them on without displacement. The last stage then contains the result. In a second variant of the displacement, all possible displacements are defined in the form of a fixed logic, in the described example this would again be 16 displacement possibilities. The current displacement N' and N'' is selected and carried out by a multiplexer.

Since all sub-hologram segments are aligned, the addition can then take place in the hologram row. Since the amount of data has quadrupled, it is also necessary to process, i.e., add up, four times the data amount. Four hologram row memory blocks are therefore necessary, which add up the four sub-hologram segments in parallel in four independent hologram rows. Since only ever two neighboring sub-hologram segments arrive per computation path, this means that, at any one time, only ever one even and one odd sub-hologram segment arrive. That is to say, instead of two full hologram row memories, two hologram row memories of half the size suffice, the first stores only the even sub-hologram segments, the other the odd ones.

In a final step, after completion of the hologram row, the four partial regions in the independent hologram row memories are combined, that is to say added up.

Figure 8:
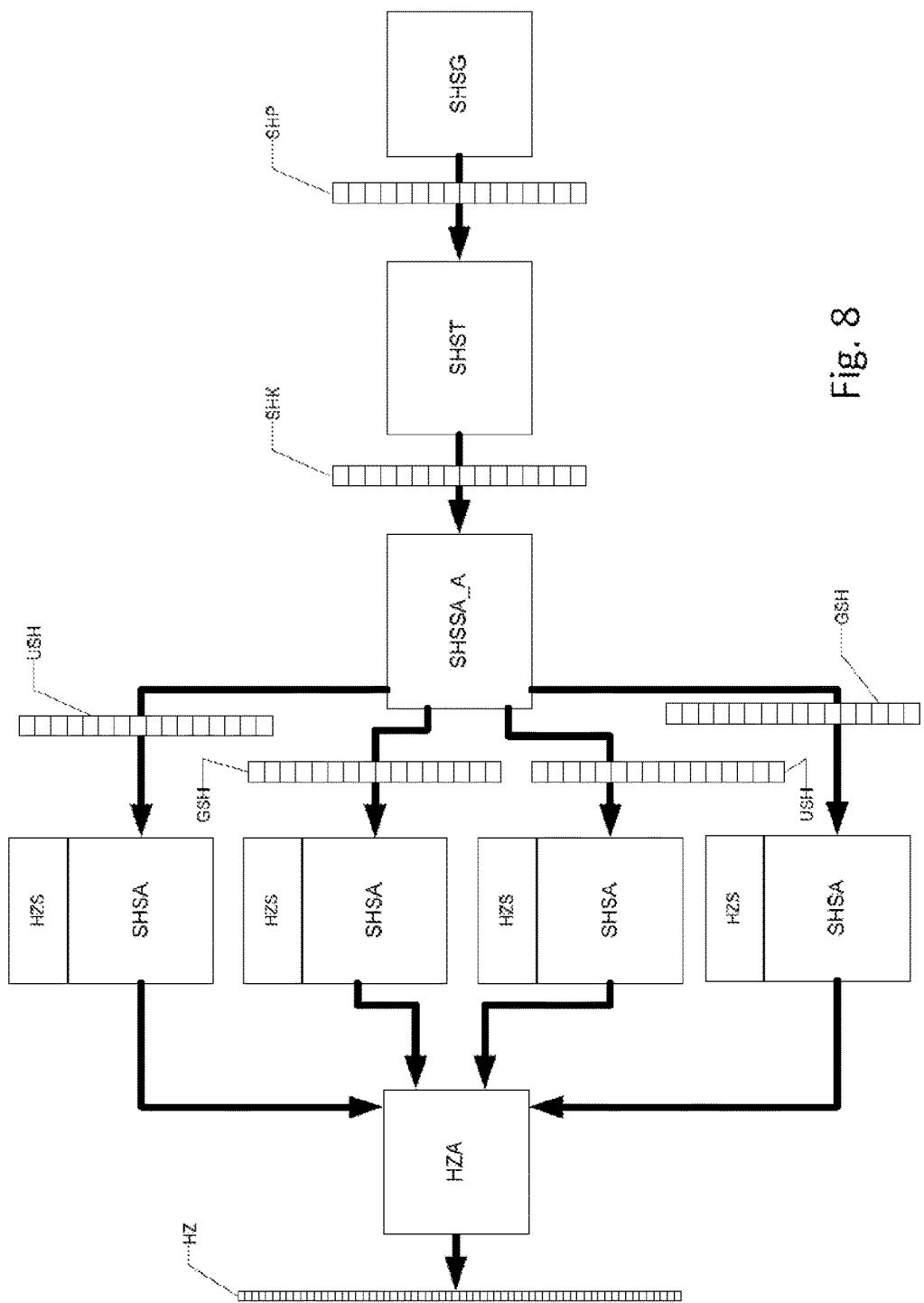
FIG. 8: shows a holographic pipeline with symmetry in a variant which is independent of the sequence

The corresponding steps in this regard are illustrated in FIG. 8, which shows a holographic pipeline with symmetry in a variant which is independent of the sequence of the incoming sub-hologram segments:

A sub-hologram segment generator SHSG first generates a sub-hologram segment with image elements, that is to say with complex values for the image elements, in the polar coordinate system SHP. This is converted by the sub-hologram segment transformation SHST into a transformed sub-hologram segment with image elements in the Cartesian coordinate system SHK.

Using the sub-hologram segment mirroring and sub-hologram segment alignment described in FIG. 7—in the first solution variant of a method for encoding a hologram of a three-dimensional scene—SHSSA_A—sub-hologram segments with an even address GSH and sub-hologram segments with an odd address USH are generated, in each case in the original and in the mirrored form.

These sub-hologram segments are subsequently fed to the sub-hologram segment addition SHSA. The hologram row memory HZS necessary herefor requires only 50% of the size as opposed to a hologram row memory according to the prior art.

In the hologram row adder HZA, the addition of the four hologram rows calculated in the preceding step takes place, the result of which is a hologram row HZ, consisting of a plurality of added-up sub-holograms, i.e. a superposition of sub-holograms.

The first solution variant described here of a method for encoding a hologram of a three-dimensional scene can then be improved further: such an improved variant will be described below as second solution variant of a method for encoding a hologram of a three-dimensional scene, see in this respect also FIG. 10.

The generated sub-hologram segment is here already generated such that no alignment at the hologram row memory is necessary anymore for this unmirrored sub-hologram segment. As a result, only one hologram row memory is required for this path.

Figure 9:
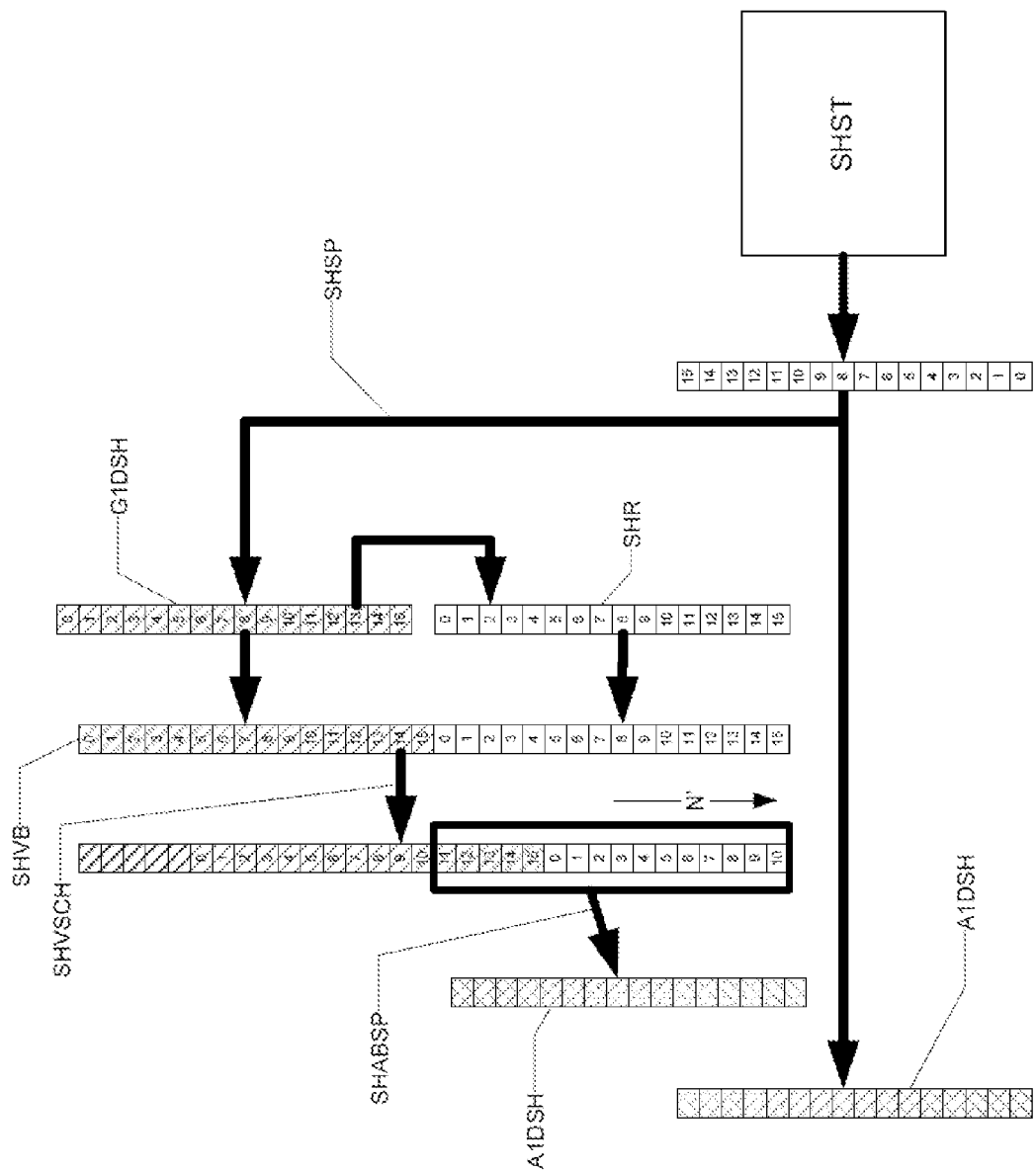
FIG. 9: shows a holographic computational pipeline for a method for encoding a hologram of a three-dimensional scene by using a symmetry by way of mirroring and alignment, but in a variant which renders alignment of the unmirrored sub-hologram segment unnecessary (second solution variant of a method for encoding a hologram of a three-dimensional scene)

This is described first in FIG. 9. The latter shows a holographic computational pipeline for a method for encoding a hologram of a three-dimensional scene by using a symmetry by way of mirroring and alignment in a second solution variant of a method for encoding a hologram of a three-dimensional scene. In the variant described, alignment of the unmirrored sub-hologram segment is, however, unnecessary.

In FIG. 9, the following steps are illustrated in this regard:
the sub-hologram segment transformation SHST, the mirroring of the incoming sub-hologram segment SHSP, which leads to the mirrored sub-hologram segment SH-Seg$_T$ G1DSH in a second computation path, outputting the stored sub-hologram segment SH-Seg$_{T-1}$ from the register for buffering SHR the current mirrored sub-hologram segment, and receiving the new sub-hologram segment SH-Seg$_T$ for storing for a unit of time connecting the current sub-hologram segment SH-Seg$_T$ with the buffered sub-hologram segment SH-Seg$_{T-1}$ SHVB displacing the sub-hologram segment by N' elements, either in stages, i.e. in N' steps, or immediately with the aid of a multiplexer SHVSCH, separating off the sub-hologram segment aligned at the memory SHABSP, the sub-hologram segment A1DSH which is aligned at the memory.

Therefore, the sequence of steps which are described for the mirrored sub-hologram segment in the second computation path is unnecessary in the first computation path, since the corresponding sub-hologram segment is aligned at the memory from the very start.

For the mirrored path, the following processing therefore takes place: after the sub-hologram segment SH-Seg$_T$ is duplicated into the second computation path and mirrored, it is linked with the sub-hologram segment SH-Seg$_{T-1}$, stored in the preceding cycle, to form a sub-hologram segment which is twice the width, that is to say in the example described here with 32 image elements BE. This results in the displacement and extraction of the 16 image elements BE, which are now aligned correctly at the hologram row memory: this is illustrated accordingly in FIG. 9.

The displacement or extraction takes place analogously to the two above-described methods by pipeline or by multiplex, by displacing all image elements BE by N' image elements BE. The bottom 16 image elements then correspond to the aligned sub-hologram segment.

As a result, likewise only one hologram row memory is now necessary for the mirrored computation path.

After the row is completed, both rows are combined, i.e. added up.

Figure 10:
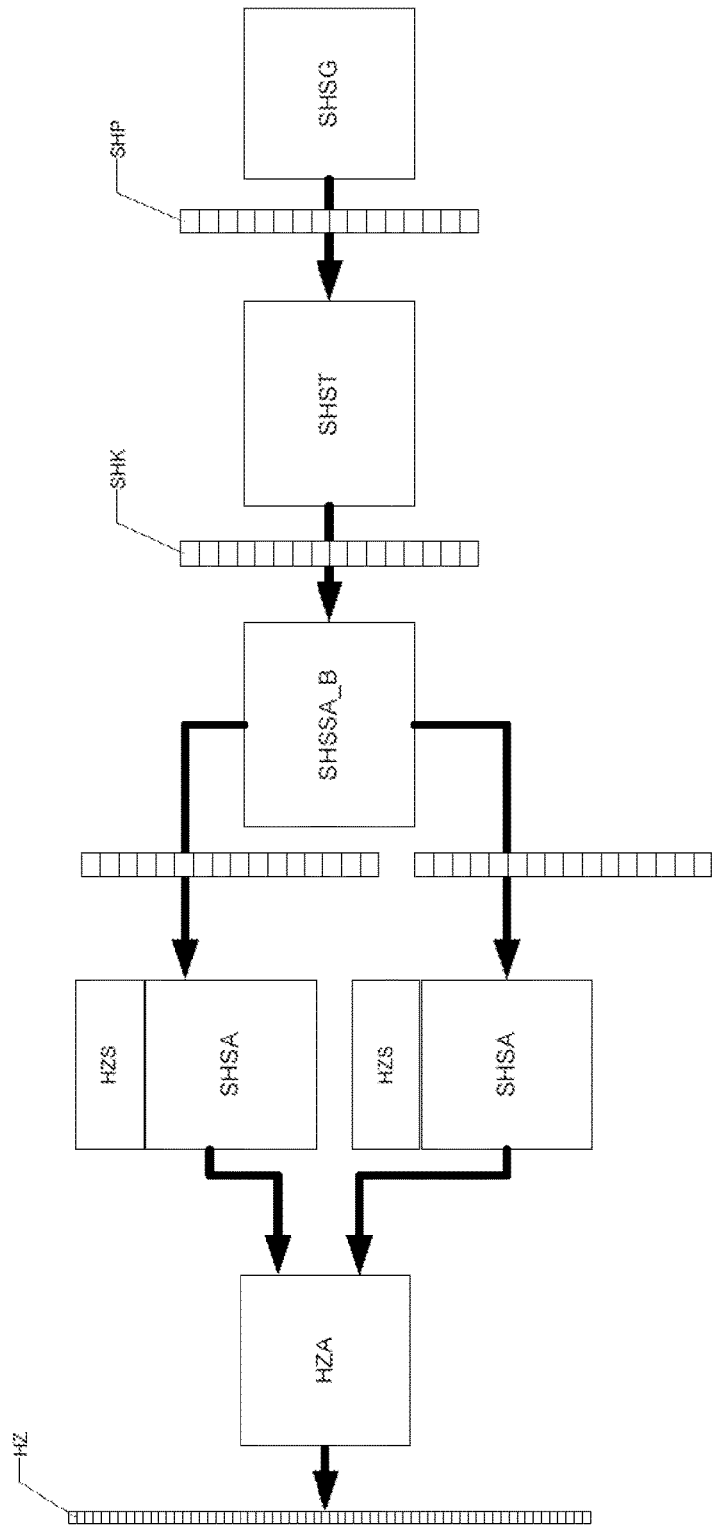
FIG. 10: shows a holographic pipeline with symmetry in a variant that is dependent on the sequence

FIG. 10 shows this as an overview for such a holographic pipeline with symmetry in a variant which is dependent on the sequence of the incoming sub-hologram segments.

A sub-hologram segment generator SHSG first generates a sub-hologram segment with image elements, i.e. with complex values for the image elements, in the polar coordinate system SHP. This is converted by the sub-hologram segment transformation SHST into a transformed sub-hologram segment with image elements in the Cartesian coordinate system SHK.

Using the sub-hologram segment mirroring and sub-hologram segment alignment described in FIG. 9—in the second solution variant of a method for encoding a hologram of a three-dimensional scene—SHSSA_B—sub-hologram segments are generated, in each case in the original and in the mirrored form.

These sub-hologram segments are subsequently supplied to the sub-hologram segment addition SHSA. This in turn requires a hologram row memory HZS.

The addition of the two hologram rows calculated in the preceding step finally takes place in the hologram row adder HZA, the result of which is a hologram row HZ, consisting of a plurality of added-up sub-holograms, i.e. a superposition of sub-holograms.

This second alternative, improved solution variant has the advantage that only two hologram row memories are necessary, and that only two sub-hologram segments need to be added up. However, there is a time dependence, i.e. only continuously successive sub-hologram segments can be processed. The first solution variant described above, on the other hand, operates independently of the time sequence.

As compared to a solution without symmetry according to the prior art, see FIG. 6, twice the amount of memory is necessary. However, the calculation is carried out twice as fast. For the same calculation speed in a solution without symmetry, two computational pipelines would need to be instantiated—in this case the amount of memory would then also be twice the amount.

The additional logic complexity or the space requirement for mirroring, alignment and hologram row memory is significantly less than the requirement for a further conventional computational pipeline without symmetry, especially in the second solution variant of a method for encoding a hologram of a three-dimensional scene, which would be necessary to calculate the hologram in the same time. This means as a result twice the calculation speed with significantly less logic and a smaller space requirement. In the inversion of the argument, more sub-holograms SH can thus be calculated with unchanging space requirement.

Figure 11:
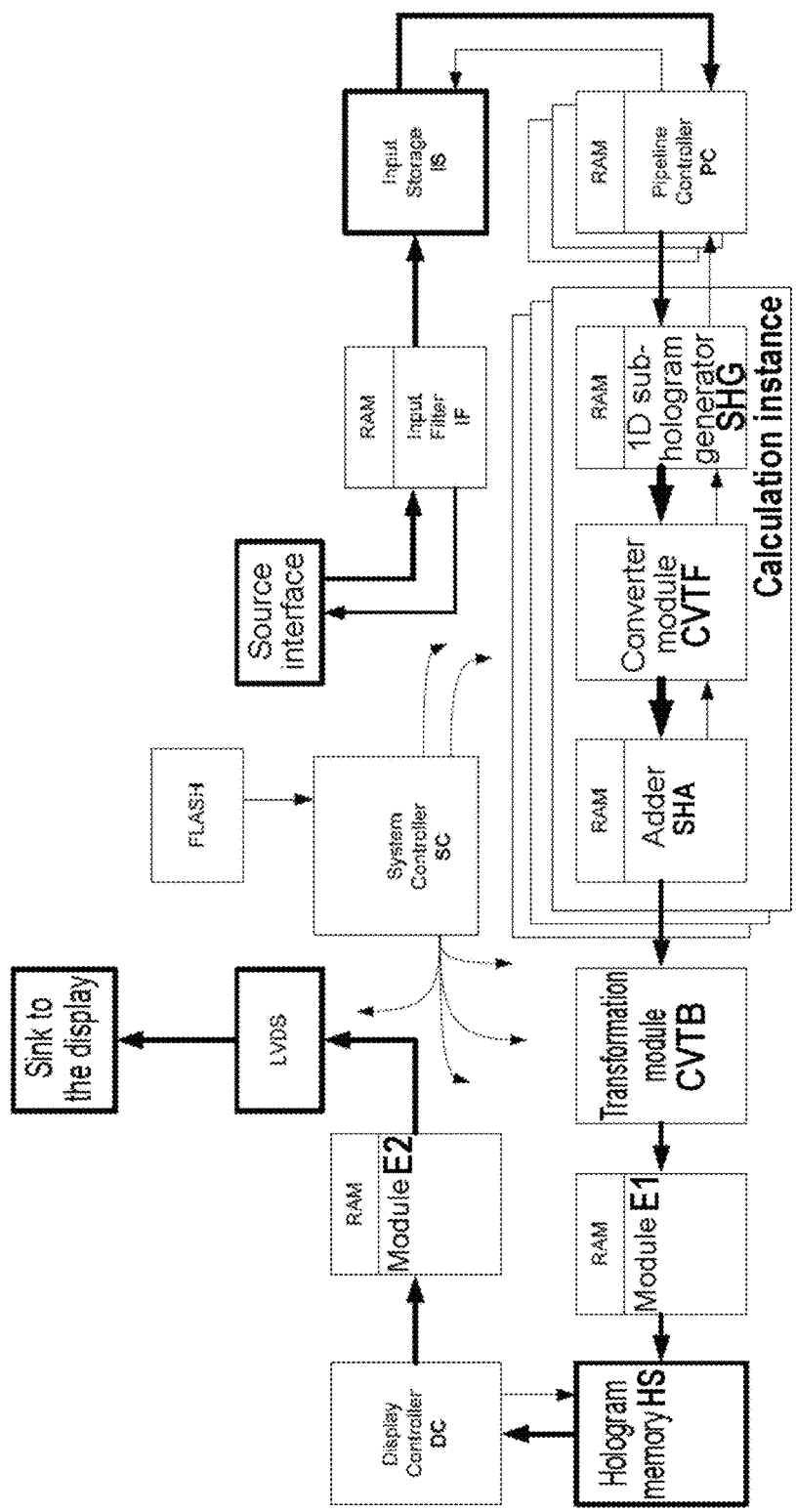
FIG. 11: shows a pipeline for hardware-based real-time calculation of holograms with the aid of sub-holograms and direct controlling of a holographic display.

A pipeline for hardware-based real-time calculation of holograms with the aid of sub-holograms and direct controlling of a holographic display is illustrated in FIG. 11. It is realized on the basis of FPGA and/or ASIC and is described below.

The calculation parameters for the hologram and the configuration parameters for the holographic display are stored in a non-volatile memory FLASH outside the FPGA or ASIC. A system controller SC (microcontroller or the like) within the FPGA or ASIC during the initialization phase loads the data from the memory FLASH and configures all modules of the holographic computational pipeline with parameters and tables. This data is stored within small local RAMs (random access memory) in the FPGA or ASIC. Furthermore, the modules which are necessary for the encoding and the outputting (formatting) according to the connected display are activated. It is furthermore determined in which format the content of the 3D scene to be represented is supplied and this is communicated to the content provider via a suitable interface, for example the DDC (display data channel) or CEC (consumer electronics control).

The continuously arriving image frames, which contain color and depth information for various views, observer and transparency planes, are received by the source interface (data channel by which 3D contents, for example color and depth information, are received by a corresponding device, for example PC, games console, media player), for example HDMI (high definition media interface) or DVI (digital visual interface), filtered (input filter IF), decomposed into object point streams and stored in a RAM (input storage IS). By triple buffering, conflict-free and continuous reading and simultaneous writing with respect to the memory IS is made possible.

The subsequent computational pipeline operates asynchronously therewith. The pipeline controller PC serves as an interface with the memory IS and controls the following parallel calculation instances (boxes which are illustrated one behind another in FIG. 11). It requests from the memory IS individual object points depending on currently calculated color/view/plane and current position in the hologram and distributes them to the individual instances depending on their workload. Each calculation instance consists of a 1D sub-hologram generator SHG, a converter module CVTF for converting complex values from the polar coordinate form into the Cartesian coordinate system, and an adder SHA, which adds the generated sub-hologram into the current hologram row. Each adder SHA comprises a hologram row buffer (not illustrated). A calculation instance typically processes all object points of the 3D scene to be illustrated, whose sub-holograms influence the currently stored hologram row in the adder SHA.

Dynamic sub-hologram sizes are made possible by generating only a small segment of a sub-hologram (consisting for example of 8 complex values) per step of the calculation. This means that a calculation unit for large sub-holograms requires more steps than for small ones. Overall, this results in a high workload as compared to a realization of the calculation with static sub-hologram size, which on the other hand would be significantly more simple to realize and would also seem more obvious in an electronic circuit.

The sub-hologram generator module SHG is also used in the calculation of 2D sub-holograms, wherein in this case the 2D sub-hologram is decomposed into a plurality of 1D sub-holograms.

When one calculation instance finishes the calculation of a hologram row, this is passed on to the hologram memory HS and stored. By triple buffering, conflict-free and continuous reading and simultaneous writing with respect to the hologram memory HS is made possible. Along the way, the back-conversion of the hologram row into the polar coordinate form takes place in the transformation module CVTB and the pre-processing for the encoding in the display takes place in the module E1.

The hologram output operates asynchronously therewith. The display controller DC controls the sequence, speed (frame rate) and formatting of the holograms to be output. The holograms can be output for example in a time-sequential manner with respect to the views and colors or interlaced. Mixed forms are likewise possible.

Just before the row-wise transfer of the hologram to the display, the final encoding step is carried out in the module E2 to bring the complex hologram values into a form which can be represented on the display used. Thereafter, the hologram is output into the sink to the display (interface for transmitting the hologram data to a holographic 3D display or to the electronics for controlling one or more spatial light modulators (SLM)), wherein for example LVDS (low voltage differential signaling) can be used as the interface.

The exemplary embodiment shown illustrates the fundamental possibility of implementing the calculation of holograms in the form of a fixed and efficient circuit and especially designing it in a configurable manner, such that it can be used for different display types and display sizes and application classes (desktop/mobile). It is characterized by real-time capability, high efficiency of the calculation sequences and its ability to use memory capacity sparingly, so as to consume as little energy as possible with as high a calculational power as possible. A further advantage is the high reusability and compatibility.

Finally, a particular note should be made of the fact that the previously mentioned exemplary embodiments serve only to describe the claimed teaching, but do not limit it to the exemplary embodiments. In particular, the above-described exemplary embodiments could—as far as possible—be combined with one another.

The invention claimed is:

1. An apparatus for calculating a 2D sub-hologram for representing an object point of a three-dimensional scene using a holographic display, comprising:
   a spatial light modulator with a matrix of image elements,
   the 2D sub-hologram containing image elements of the spatial light modulator and having a rotational symmetry,
   the 2D sub-hologram comprising a half 1D sub-hologram along a section through the 2D sub-hologram from the origin of the 2D sub-hologram up to a maximum radius of the 2D sub-hologram,
   the radius of each image element is determined and each image element of the 2D sub-hologram is electrically fixedly connected to at least one image element of the half 1D sub-hologram with identical or similar radius by way of a hard-wired electronic circuit.

2. The apparatus as claimed in claim 1, wherein each image element of the 2D sub-hologram is fixedly assigned to at least one image element of the half 1D sub-hologram by way of an electronic circuit such that the radius of the image element of the 2D sub-hologram corresponds to the radius of an image element of the half 1D sub-hologram that is multiplied by a direction-dependent elongation factor.

3. The apparatus as claimed in claim 1, wherein the electronic circuit is realized in the form of a hard-wired matrix.

4. The apparatus as claimed in claim 1, wherein the electronic circuit is implemented on application field programmable logic gate arrays and/or application-specific integrated circuits.

5. An apparatus as claimed in claim 1, wherein the electronic circuit comprises at least one electronic element generating intermediate values by linking two or more image elements of the half 1D sub-hologram and assigning the image elements of the 2D sub-hologram to these intermediate values.

6. An apparatus for calculating a hologram for representing a three-dimensional scene, comprising:
   an apparatus for calculating a 2D sub-hologram of an object point of said three-dimensional scene as claimed in claim 1, and
   a converter transforming the 2D sub-hologram from polar to Cartesian coordinates
   an electronic positioner positioning the 2D sub-hologram on the spatial light modulator as a function of the location of the object point of the three-dimensional scene and the position of an observer of said scene, and
   an adder superposing the respective 2D sub-holograms of different object points of said three-dimensional scene by way of addition of the respective real and imaginary parts of the same image elements.

* * * * *